M. KOHL.
WHEEL RIM RETAINING AND DEMOUNTING DEVICE.
APPLICATION FILED AUG. 30, 1920.

1,404,975.

Patented Jan. 31, 1922.
2 SHEETS—SHEET 1.

Inventor:
Mike Kohl

M. KOHL.
WHEEL RIM RETAINING AND DEMOUNTING DEVICE.
APPLICATION FILED AUG. 30, 1920.

1,404,975.

Patented Jan. 31, 1922.
2 SHEETS—SHEET 2.

Inventor.
Mike Kohl

UNITED STATES PATENT OFFICE.

MIKE KOHL, OF NORTH MILWAUKEE, WISCONSIN.

WHEEL-RIM RETAINING AND DEMOUNTING DEVICE.

1,404,975.  Specification of Letters Patent.  Patented Jan. 31, 1922.

Application filed August 30, 1920. Serial No. 406,968.

*To all whom it may concern:*

Be it known that I, MIKE KOHL, a citizen of the Austrian Republic, and resident of North Milwaukee, in the county of Milwaukee and State of Wisconsin, have invented certain new and useful Improvements in Wheel-Rim Retaining and Demounting Devices; and I do hereby declare that the following is a full, clear, and exact description thereof.

My invention relates to new and useful improvements in means for securing demountable rims on vehicle wheels and also means for demounting such rims.

As demountable rims are normally applied to vehicle wheels, there is considerable difficulty in removing or applying the same, and much time consumed in performing these operations. Therefore, it is the primary object of this invention to provide a rim retaining means which can be very quickly actuated to securely hold a wheel rim in place.

It is a further object of the invention to provide an arrangement of this character which is carried by the wheel and not removed therefrom as is necessary in standard retaining means for wheel rims.

A still further object of the invention is to provide means for quickly removing tire carrying rims from vehicle wheels.

With these general objects in view, the invention consists in the novel features of construction, combination and arrangement of parts which will be hereinafter more particularly described and claimed.

In the accompanying drawings.

Figure 1:
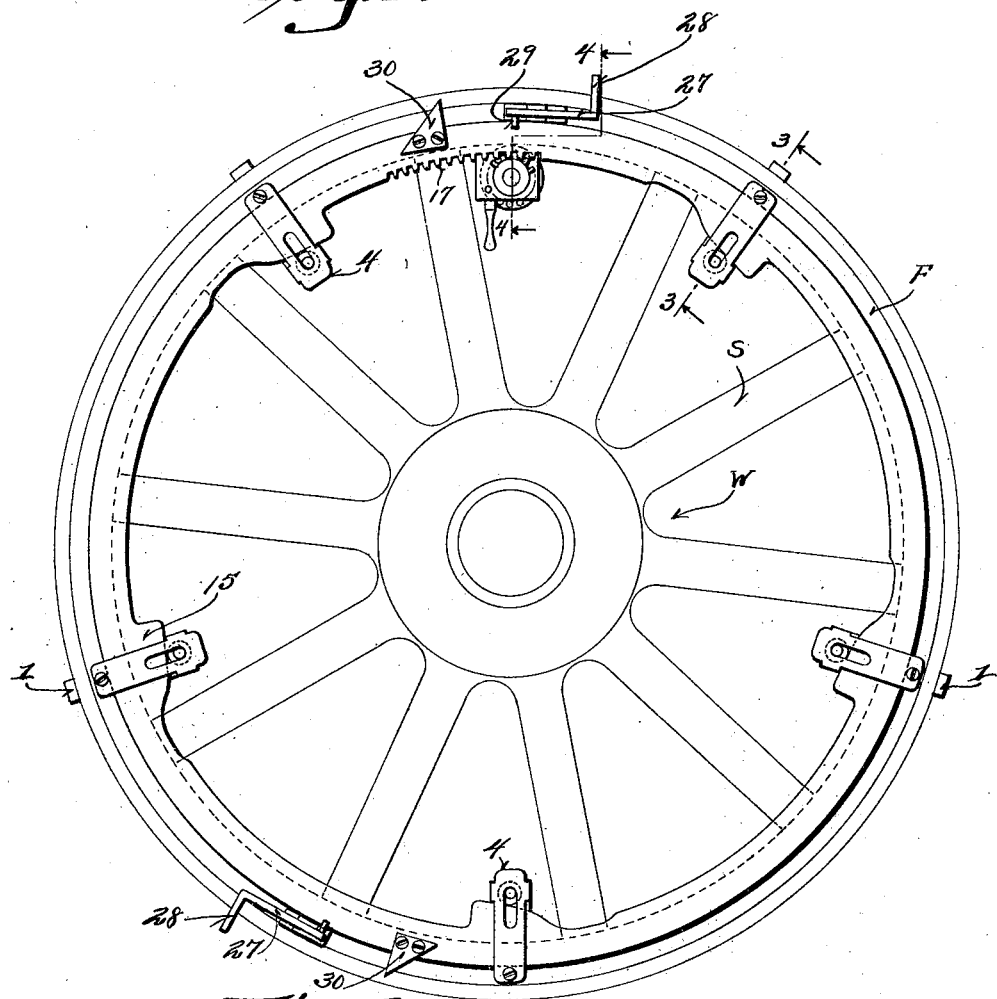
Figure 1 represents an elevational view of a vehicle wheel having my combined rim retaining and demounting means carried thereby.
Figure 2:
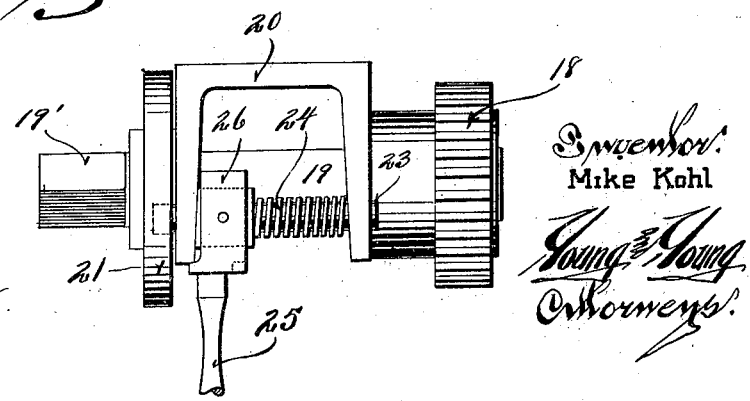
Figure 2 is a detail side elevational view of the actuating portion of the device, as well as the locking means therefor.

Referring more particularly to the drawings, it will be seen that the reference character W denotes a wheel having spokes S and a felly F. A demountable rim R is designed to be carried on the periphery of the felly, the reinforcing band B thereof having a shoulder S' against which one edge of the rim engages. The retaining means of my invention provides an arrangement for securing the rim R in place and in abutting relation with said shoulder S'.

In its preferred embodiment said invention includes a plurality of rim retaining arms 1 arranged about the felly in spaced apart relation, these arms forming parts of bellcranks 2, the other or actuating arms thereof being designated by the reference characters 3. An attaching frame 4 is secured to the felly F at each point where it is desirable to dispose one of the rim retaining arms, and the bellcranks 2 of which said arms form a part are pivoted to the side plates 5 thereof by means of pivot pins 6. Thus the bellcranks 2 are arranged so that the actuating arms 3 thereof extend between the spokes S and transversely of the felly F.

The free end of each of the actuating arms 3 has a longitudinally extending roller pintle 7 which extends into a slot 8 formed in a guide plate 9, which comprises one part of the attaching frame 4. In other words the inner ends of the guide plates 9 are connected with the side plates 5 of the attaching frame, whereas their outer ends are secured to the felly F by screws or the like 10. The intermediate portions of the shanks of the screws 10 receive spacing sleeves 11 whereby to space the guide plates 9 away from one side of the felly F a sufficient distance to receive a cam ring 12.

This cam ring 12 rides on cam rollers 13 carried by the pintles 7 and guide rollers 14 disposed on the spacing sleeves 11. At a plurality of points on the inner edge of the cam ring 12 are formed cam surfaces 15, one of which is located adjacent each of the brackets 4 and movable therethrough when said ring is circumferentially shifted. In other words the rollers 13 ride on the cam surfaces 15 when the latter move back and forth within the frames 4 to thus rock the bell cranks 2 and move the rim retaining arms into or out of operative position. Expansile coil springs 16 positioned between the rim retaining arms 1 and the felly F urge the former outwardly, thereby causing the cam rollers to be engaged with the cam surfaces 15 on the inner surfaces of the ring 12 at all times.

Figure 4:
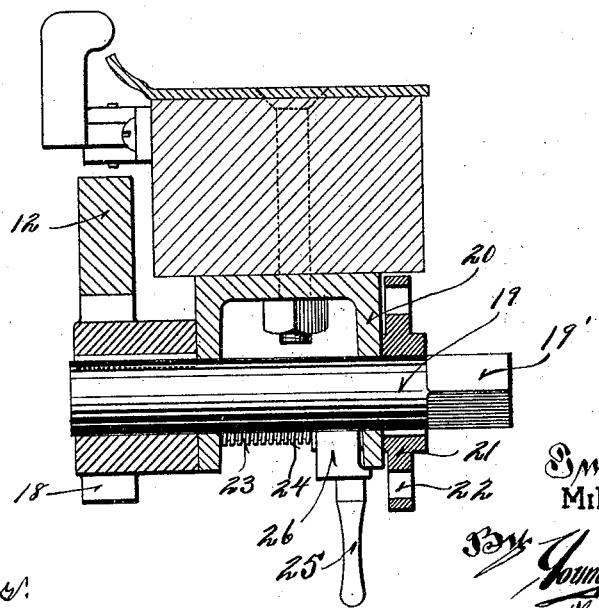

A portion of the inner periphery of said cam ring 12 has a plurality of rack teeth 17 with which the teeth of a pinion or a gear 18 are meshed, and it is obvious that when the latter is rotated, the cam ring is shifted circumferentially with respect to the felly F. Referring more especially to Figure 4, it will be seen that the gear 18 is carried on a shaft 19 journaled in bearings formed in a bracket 20. The latter is fixed to the felly F so that the shaft 19 is relatively stationary to the latter with the result that when a suitable tool is placed on the squared end 19' of said shaft and rotated, said cam ring 12 will be moved in a suitable direction.

The shaft 19 also carries a locking plate 21 in which is formed a circle of pin engaging openings 22, and the shaft bracket 20 supports a sliding locking pin 23, one end of which is designed to be engaged in any one of said holes 22. An expansile spring 24 normally urges the pin toward the locking plate and into engagement with one of the holes therein, but said locking pin 23 is readily shifted at the will of the operator by means of a handle 25, the same being pivotally carried by a block 26. Thus when the handle 25 is moved toward the gear 18, the sliding pin 23 will be moved in a like direction and thus it will be disengaged from the locking plate 21. Provision is also made for holding the locking pin in inoperative position during the rotation of the shaft 19.

The felly F is provided with one or more rim removing devices, each of which consists of a lever 27, a rim projecting arm 28 and a stop pin 29. The levers 27 are pivoted to the felly F in such positions that the arms 28 extend above the shoulder S' of the felly band B and when they are properly rocked the inner side of the rim R is engaged and the same is forced from the felly. Rocking of the levers is procured by trips 30 carried by the cam ring 12. In other words although the levers 27 and rim projecting arms 28 are normally inactive, the trips 30 are brought into engagement with the former when the ring 12 is circumferentially shifted in one direction, that is to say in a direction which will cause the release of the rim retaining arms 1.

Figure 3:
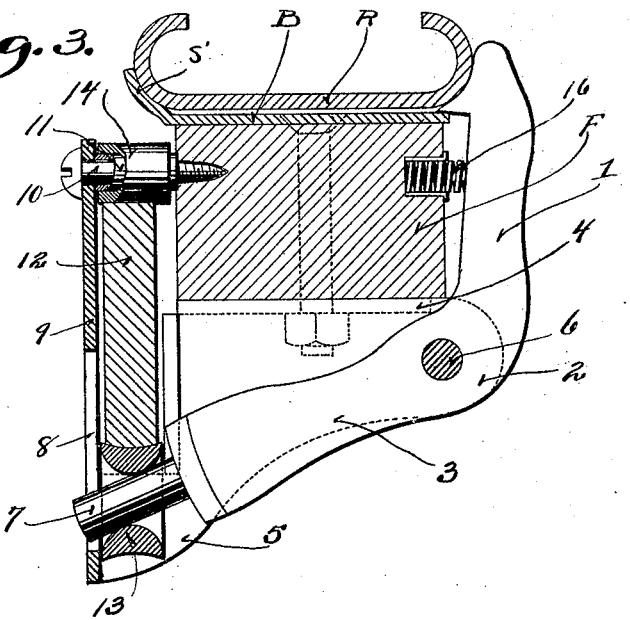
Figure 3 is a transverse sectional view taken on the plane of the line 3—3 of Figure 1, and, Figure 4 is a similar view on the plane of the line 4—4 of Figure 1.

The operation of the invention is substantially and briefly as follows:

Assuming that a rim R and a tire carried thereby is to be placed on the felly of a wheel, the shaft 19 is rotated by a suitable means so that the ends of the rim retaining arms 1 are spaced inwardly of the surface of the band B. This movement of the arms 1 is procured by the rocking of the bellcranks 2 through the engagement of the cam surfaces 15 with the rollers 13. After the rim R has been properly seated on the band B, the shaft 19 is rotated in the opposite direction to shift the bellcranks into the position indicated in Figure 3. In other words the rim engaging portions of the arms 1 will be in contact with the rim R and the same forced against the shoulder S'. Any type of rim can thus be effectively held upon its felly. After the rim R is thus engaged by the rim retaining arms, the locking pin 23 is permitted to engage in one of the holes 22 in the locking plate 21. Accidental rotation of the shaft is thus absolutely prevented and the rim cannot be removed until said cam ring is again shifted.

If it should be necessary to remove the rim, the shaft 19 is unlocked and rotated in a manner to cause the release of the rim retaining arms as hereinbefore mentioned. Such a rotation of the shaft with its consequent movement of the cam ring 12 engages the trips 30 with the levers 27 and rocks the same so that said rim is mechanically forced from the felly. This feature is of considerable importance in readily removing rims which tend to stick or bind, or those which have become rusted in place.

I claim:

1. A mechanism of the class described including in combination with a wheel and a demountable rim, a plurality of retaining elements carried by the wheel, and means for simultaneously moving the elements into retaining position in engagement with the rim, the last part of the movement being in a direction perpendicular to the plane of the wheel.

2. A mechanism of the class described including in combination with a wheel and a demountable rim, a plurality of retaining elements carried by the wheel, and means for either simultaneously moving the elements in an arcuate path into retaining position in engagement with the rim or out of such position to permit removal of said rim, the plane of said arcuate path being perpendicular to the rim at that point.

3. A mechanism of the class described including in combination with a wheel and a demountable rim, a plurality of pivotally mounted retaining elements carried by the wheel, means for locking said elements in retaining position, means for simultaneously moving the elements out of retaining position to permit removal of the rim, and means operable in synchrony with the last named means to force the rim from the wheel.

4. A mechanism of the class described including in combination with a wheel and a demountable rim, a plurality of retaining elements carried by the wheel, means for simultaneously moving the elements into retaining position in engagement with the rim, the last part of the movement being in a direction perpendicular to the plane of the wheel, and means for locking the last named means against operation.

5. A mechanism of the class described including in combination with a wheel and a demountable rim, a plurality of retaining elements in the form of levers pivoted to the wheel to swing in an arc perpendicular to the rim, and means for simultaneously rocking the levers to move the same in operative position.

6. A mechanism of the class described including in combination with a wheel and a demountable rim, a plurality of retaining elements in the form of levers pivoted to the wheel to swing in an arc perpendicular to the rim, a band loosely carried by the wheel, means for oscillating the band with respect to the wheel, and means on the band for engaging and rocking said levers.

In testimony that I claim the foregoing I have hereunto set my hand at Milwaukee, in the county of Milwaukee and State of Wisconsin.

MIKE KOHL.